United States Patent
Ko et al.

(10) Patent No.: US 9,749,117 B2
(45) Date of Patent: Aug. 29, 2017

(54) METHOD AND APPARATUS FOR TRANSMITTING CONTROL INFORMATION IN A WIRELESS COMMUNICATION SYSTEM

(75) Inventors: Hyunsoo Ko, Anyang-si (KR); Kitae Kim, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 748 days.

(21) Appl. No.: 14/233,450

(22) PCT Filed: Jul. 26, 2012

(86) PCT No.: PCT/KR2012/005965
§ 371 (c)(1),
(2), (4) Date: Jan. 17, 2014

(87) PCT Pub. No.: WO2013/015629
PCT Pub. Date: Jan. 31, 2013

(65) Prior Publication Data
US 2014/0153531 A1   Jun. 5, 2014

Related U.S. Application Data

(60) Provisional application No. 61/511,570, filed on Jul. 26, 2011.

(51) Int. Cl.
*H04L 5/12* (2006.01)
*H04L 5/00* (2006.01)
*H04L 1/18* (2006.01)

(52) U.S. Cl.
CPC .......... *H04L 5/0092* (2013.01); *H04L 1/1819* (2013.01); *H04L 1/1854* (2013.01)

(58) Field of Classification Search
CPC .............................. H04L 5/0053; H04L 5/001
(Continued)

(56) References Cited

U.S. PATENT DOCUMENTS

2010/0135273 A1* 6/2010 Kim .................. H04B 1/69
                                                         370/344
2012/0039241 A1* 2/2012 Seo .................... H04B 7/15542
                                                         370/315
(Continued)

FOREIGN PATENT DOCUMENTS

CN         101682919 A      3/2010
CN         102036314 A      4/2011
(Continued)

OTHER PUBLICATIONS

State Intellectual Property Office of the People's Republic of China Application Serial No. 201280036857.8, Office Action dated Apr. 5, 2016, 17 pages.
(Continued)

*Primary Examiner* — Mark Rinehart
*Assistant Examiner* — Matthew Hopkins
(74) *Attorney, Agent, or Firm* — Lee Hong Degerman Kang Waimey

(57) ABSTRACT

One embodiment of the present invention relates to a method for transmitting control information by a base station, comprising the steps of: transmitting data through a physical downlink shared channel (PDSCH); and receiving a receipt acknowledgement in response to said data in the $4^{th}$ subframe following the subframe in which said data is transmitted. When downlink control information that indicates said PDSCH is transmitted in a resource region not including a resource indicated by a physical control format indication channel, the downlink control information is transmitted in $k^{th}$ subframe prior to the subframe in which the PDSCH is transmitted.

10 Claims, 12 Drawing Sheets

(58) Field of Classification Search
USPC .......................................................... 370/252
See application file for complete search history.

(56) References Cited

U.S. PATENT DOCUMENTS

2012/0113831 A1* 5/2012 Pelletier ................ H04L 5/0058
                                                           370/252
2013/0028149 A1* 1/2013 Chen ..................... H04L 5/0005
                                                           370/280

FOREIGN PATENT DOCUMENTS

| CN | 102047744 A | 5/2011 |
|---|---|---|
| JP | 2006-109519 | 4/2006 |
| KR | 10-2010-0121434 | 11/2010 |
| KR | 10-2011-0073689 | 6/2011 |
| WO | 2009116760 A2 | 9/2009 |
| WO | 2010024582 A2 | 3/2010 |
| WO | 2011/025195 | 3/2011 |

OTHER PUBLICATIONS

PCT International Application No. PCT/KR2012/005965, Written Opinion of the International Searching Authority dated Jan. 10, 2013, 20 pages.

* cited by examiner

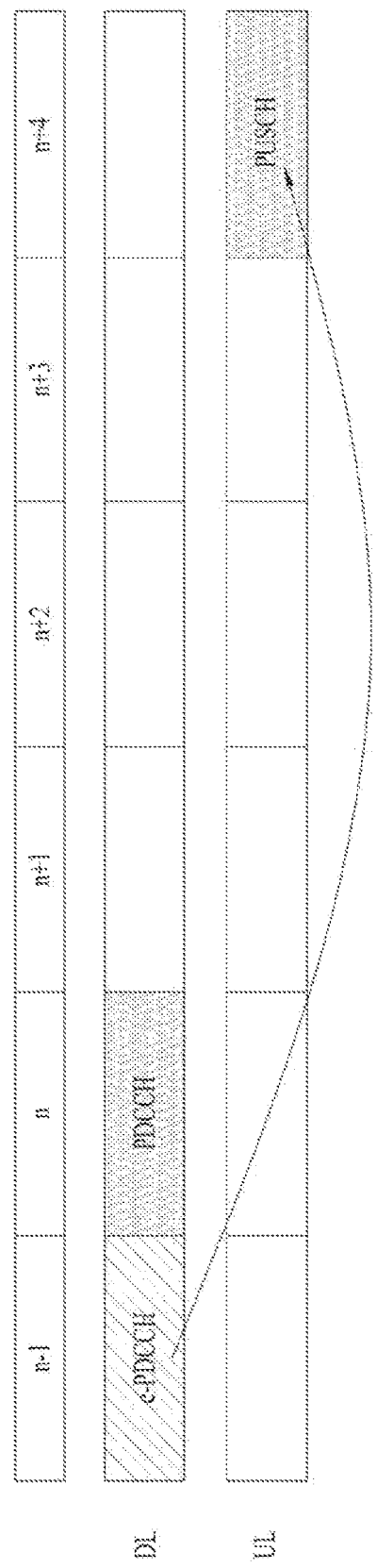

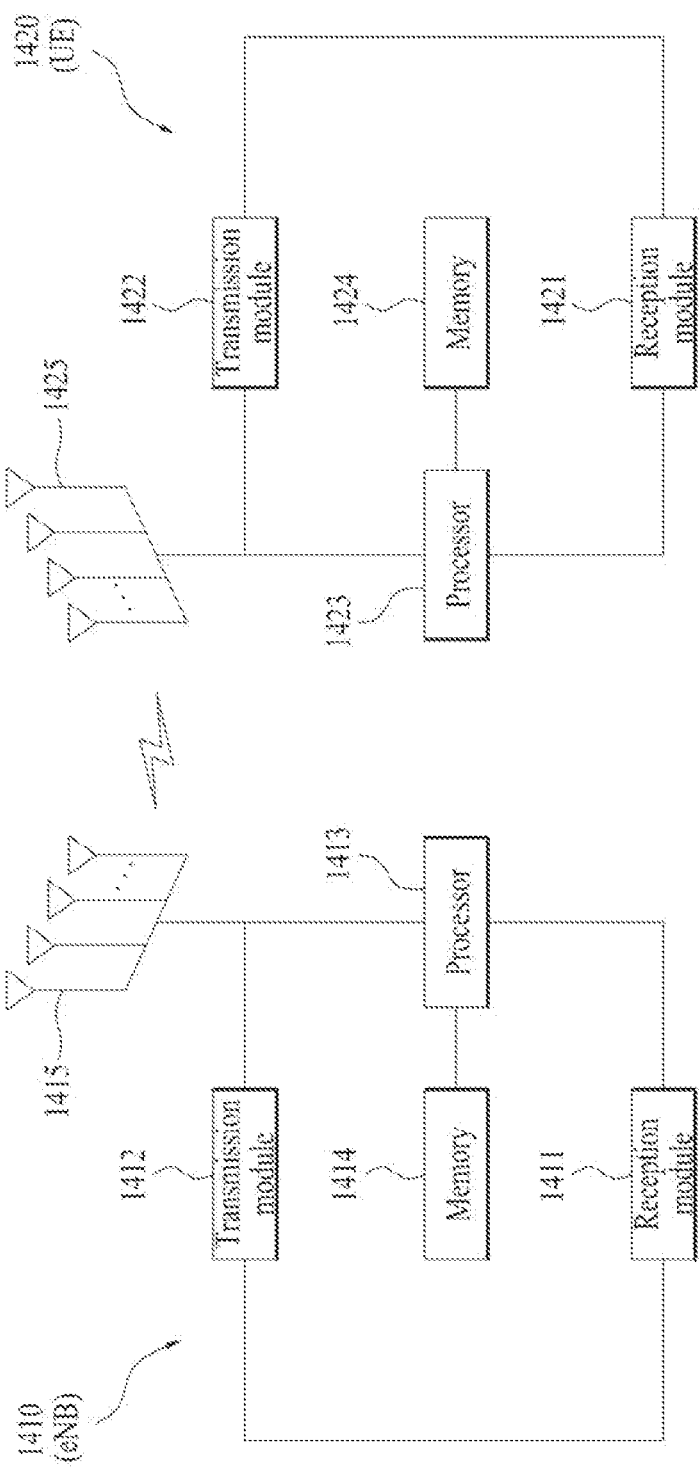

METHOD AND APPARATUS FOR TRANSMITTING CONTROL INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2012/005965, filed on Jul. 26, 2012, which claims the benefit of U.S. Provisional Application Ser. No. 61/511,570, filed on Jul. 26, 2011, the contents of which are hereby incorporated by reference herein in their entirety.

TECHNICAL FIELD

Following description relates to a method of transceiving control information in a wireless communication system and an apparatus therefor.

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF THE INVENTION

Technical Task

The present invention relates to a method of transceiving control information and an apparatus therefor. More particularly, the present invention relates to a transmission timing of a signal in case of introducing e-PDCCH.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to a first technical solution of the present invention, a method of transmitting control information, which is transmitted by an eNode B in a wireless communication system includes the steps of transmitting a data on a physical downlink shared channel (PDSCH) and receiving a reception confirmation response for the data in a $4^{th}$ following subframe from a subframe in which the data is transmitted, wherein if downlink control information (DCI) indicating the PDSCH is transmitted in a resource region except a resource indicated by a physical control format indication channel, the DCI is transmitted in a $k^{th}$ preceding subframe of a subframe in which the PDSCH is transmitted.

According to a second technical solution of the present invention, a method of receiving control information, which is received by a user equipment (UE) in a wireless communication system includes the steps of receiving a data on a physical downlink shared channel (PDSCH) and transmitting a reception confirmation response for the data in a $4^{th}$ following subframe from a subframe in which the data is transmitted, wherein if downlink control information (DCI) indicating the PDSCH is transmitted in a resource region except a resource indicated by a physical control format indication channel, the DCI is received in a subframe immediately before a subframe in which the PDSCH is received.

According to a third technical solution of the present invention, an eNode B in a wireless communication system includes a transmission module and a processor, the processor configured to transmit a data a data on a physical downlink shared channel (PDSCH), the processor configured to receive a reception confirmation response for the data in a $4^{th}$ following subframe from a subframe in which the data is transmitted, wherein if downlink control information (DCI) indicating the PDSCH is transmitted in a resource region except a resource indicated by a physical control format indication channel, the DCI is transmitted in a $k^{th}$ preceding subframe of a subframe in which the PDSCH is transmitted.

According to a fourth technical solution of the present invention, an eNode B in a wireless communication system includes a transmission module and a processor, the processor configured to transmit a physical downlink control channel (PDCCH), the processor configured to receive a data in a $4^{th}$ following subframe from a subframe in which the PDCCH is transmitted, wherein if downlink control information (DCI) on a resource to which the data is transmitted thereto is transmitted in a resource region except a resource indicated by a physical control format indication channel, the DCI is transmitted in a $k^{th}$ preceding subframe of a subframe in which the PDCCH is transmitted.

The first to the second technical solution of the present invention can include all or a part of the following description.

The k is determined in consideration of at least one selected from the group consisting of a cell size, a processing time of a user equipment (UE), and a position of the UE within a cell.

The DCI can include allocation information of a resource block to which the PDSCH is transmitted thereto.

The DCI may be valid until a subframe to which the PDSCH is transmitted thereto.

The DCI may be transmitted in a manner of being precoded together with a UE-specific reference signal.

The third to the fourth technical solution of the present invention can include all or a part of the following description.

The k may be determined in consideration of at least one selected from the group consisting of a cell size, a processing time of a user equipment (UE), and a position of the UE within a cell.

The DCI can include grant information of a resource block to which the data is transmitted thereto.

The grant information of the resource block may indicate contiguous resource blocks.

The DCI may be transmitted in a manner of being precoded together with a UE-specific reference signal.

It is to be understood that both the foregoing general description and the following detailed description are exemplary and explanatory and are intended to provide further explanation of the invention as claimed.

Advantageous Effects According to the present invention, it is able to smoothly secure a decoding time in case of introducing e-PDCCH.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 13 is a diagram for explaining PUSCH transmission timing according to one embodiment of the present invention;

FIG. 14 is a diagram for a configuration of an eNode B and a user equipment according to the present invention.

BEST MODE

Mode for Invention

Figure 1:
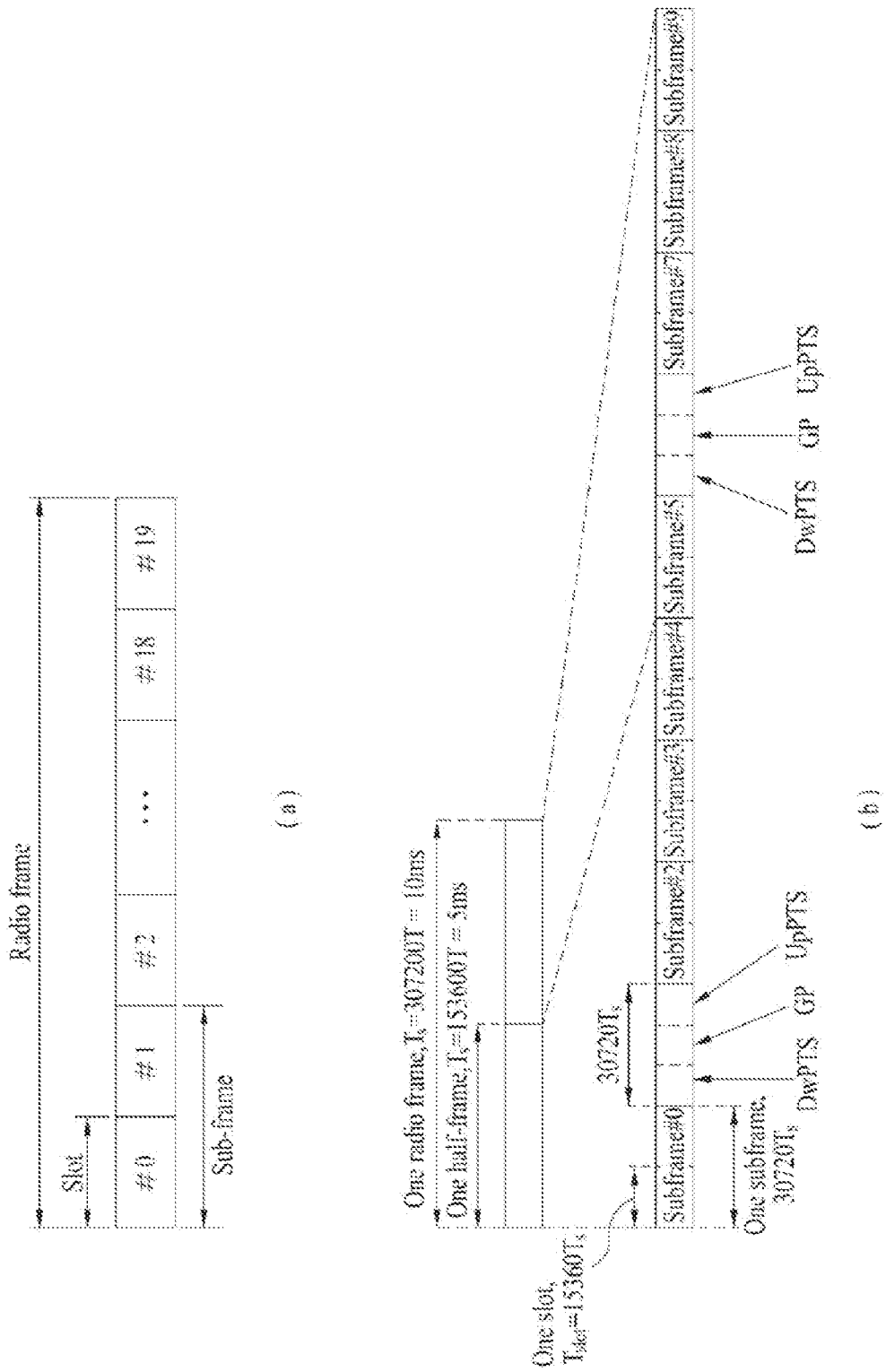
FIG. 1 is a diagram for explaining a structure of a downlink radio frame.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

FIG. 1 is a diagram for explaining a structure of a downlink radio frame. Referring to FIG. 1 (a), one radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain. Since 3GPP LTE system uses OFDMA in downlink, OFDM symbol is provided to indicate one symbol period. The OFDM symbol may be named SC-FDMA symbol or symbol period in uplink. Resource block (RB) is a resource allocation unit and may include a plurality of contiguous subcarriers in one slot. The above-described structures of the radio frame are exemplary only. Hence, the number of subframes included in a radio frame, the number of slots included in the subframe and the number of OFDM symbols included in the slot may be modified in various ways.

FIG. 1 (b) is a diagram for a structure of a type 2 radio frame. The type 2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in an eNode B and uplink transmission synchronization of a user equipment. The guard period is a period for eliminating interference generated in uplink due to multi-path delay of a downlink signal between uplink and downlink.

In this case, the structures of the radio frame are exemplary only. And, the number of subframes included in a radio frame, the number of slots included in the subframe and the number of symbols included in the slot may be modified in various ways.

Figure 2:
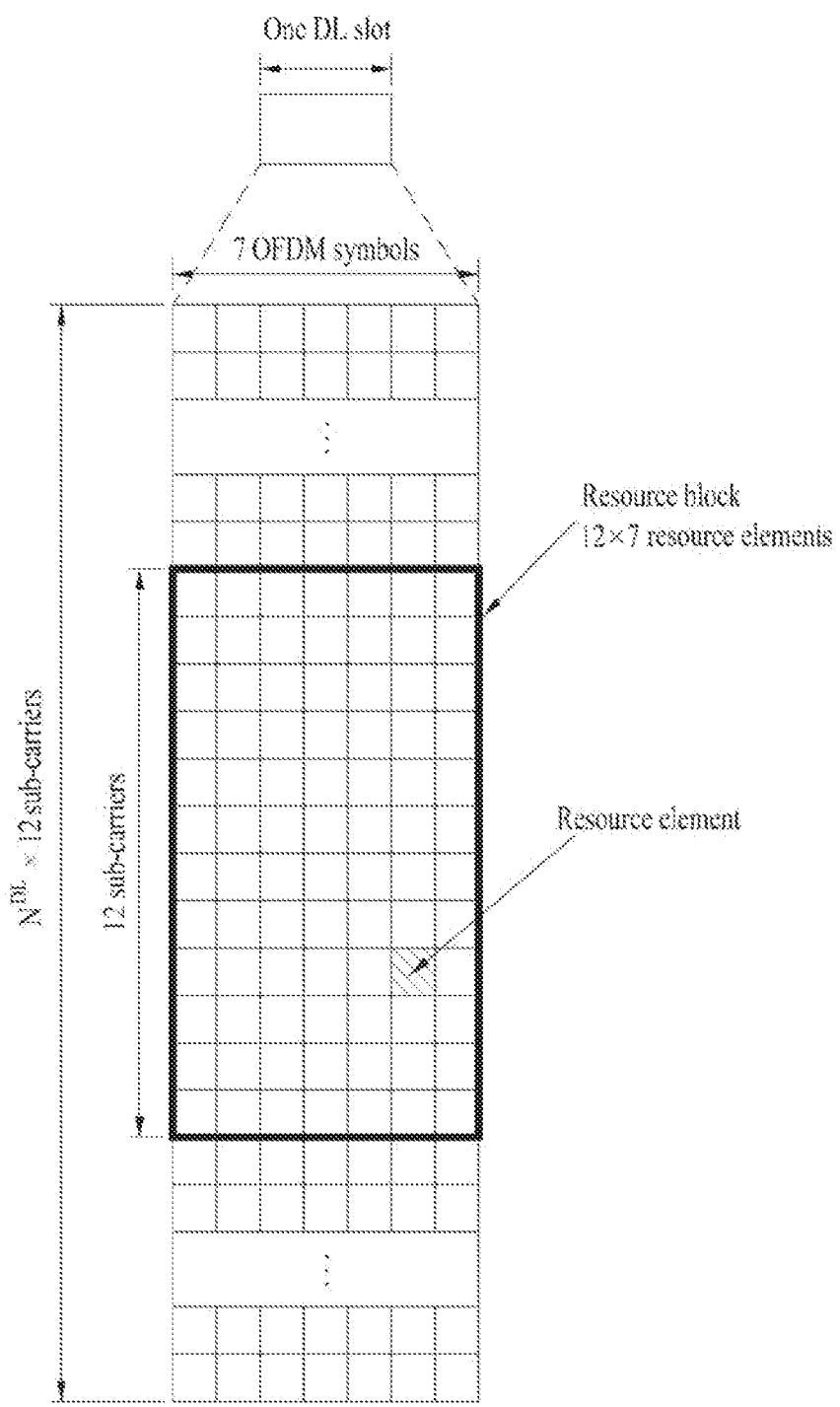
FIG. 2 is a diagram for an example of a resource grid for a downlink (DL) slot.

FIG. 2 is a diagram for an example of a resource grid for a downlink (DL) slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
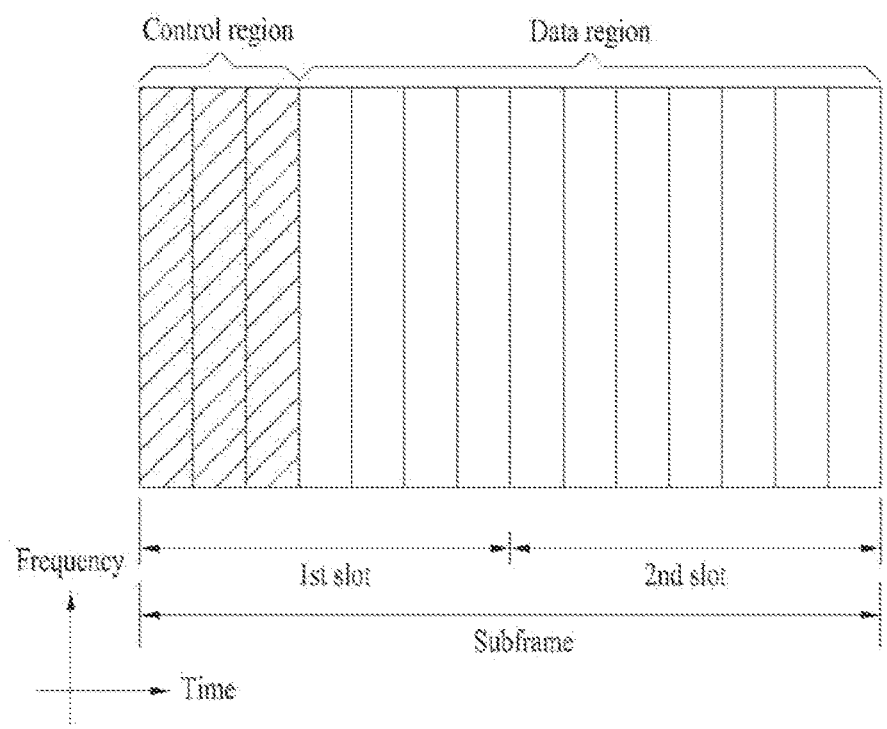
FIG. 3 a diagram for a structure of a downlink (DL) subframe.

FIG. 3 a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and includes information on the number of OFDM symbols used for a transmission of a control channel within the subframe.

The PHICH is a response channel in response to UL transmission and includes an ACK/NACK signal.

Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
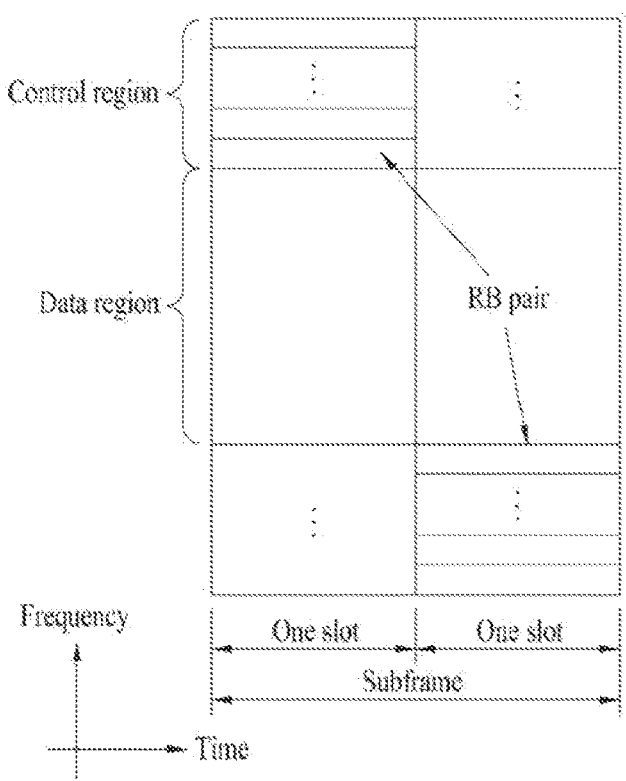
FIG. 4 is a diagram for a structure of an uplink (UL) subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

DCI Format

According to a current LTE-A (release 10), DCI format 0, 1, 1A, 1B, 1C, 1D, 2, 2A, 2B, 2C, 3, 3A, and 4 are defined. In this case, the DCI format 0, 1A, 3, and 3A are regulated to have an identical message size to reduce the numbers of blind decoding, which shall be described later. The DCI formats can be classified into i) DCI format 0 and 4 used for UL scheduling grant, ii) DCI format 1, 1A, 1B, 1C, 1D, 2, 2A, 2B, 2C used for DL scheduling assignment, and iii) DCI format 3 and 3A used for a power control command according to a usage of control information to be transmitted.

In case of the DCI format 0 used for UL scheduling grant, the DCI format 0 can include a carrier offset (carrier indicator) necessary in relation to a carrier aggregation, which is described later, an offset (flag for format 0/format 1A differentiation) used for distinguishing the DCI format 0 from the DCI format 1, a hopping flag (frequency hopping flag) informing of whether a frequency hopping is used in an UL PUSCH transmission, information on resource block assignment, which should be used by a UE to transmit PUSCH, a modulation and coding scheme, a new data offset (a new data indicator) used to empty a buffer for an initial transmission in relation to a HARQ process, a transmit power control command for PUSCH (TPC command for scheduled for PUSCH), cyclic shift information (cyclic shift for DM RS and OCC index) for DMRS (demodulation reference signal), an UL index necessary for performing a TDD operation, channel quality information (channel quality indicator) request information (CSI request), and the like. Meanwhile, since the DCI format 0 uses synchronous HARQ, the DCI format 0 does not include a redundancy version as like DCI formats related to DL scheduling assignment do. The carrier offset is not included in the DCI format if the cross carrier scheduling is not used.

The DCI format 4 is newly added to LTE-A release 10. The DCI format 4 is defined to support that a spatial multiplexing is applied to a UL transmission. Compared to the DCI format 0, since the DCI format 4 further includes informations for the spatial multiplexing, the DCI format 4 has a bigger message size and further includes additional control information in addition to the control information included in the DCI format 0. In particular, the DCI format 4 further includes a modulation and coding scheme for a second transmission block, precoding information for a multi antenna transmission, and sounding reference signal (SRS) request information. Meanwhile, since the DCI format 4 has a size greater than the DCI format 0, the DCI format 4 does not include an offset to distinguish the DCI format 0 from the DCI format 1A.

The DCI format 1, 1A, 1B, 1C, 1D, 2, 2A, 2B, 2C related to a DL scheduling assignment can be mainly divided into 1, 1A, 1B, 1C, and 1D not supporting a spatial multiplexing and 2, 2A, 2B, and 2C supporting the spatial multiplexing.

The DCI format 1C is used for a compact DL assignment and supports a frequency consecutive assignment only. Unlike the other formats, the DCI format 1C does not include a carrier offset and a redundancy version.

The DCI format 1A is a format used for a DL scheduling and a random access procedure. The DCI format 1A can include a carrier offset, an indicator indicating whether a DL distributed transmission is used, PDSCH resource allocation information, a modulation and coding scheme, a redundancy version, a HARQ processor number configured to inform of a processor used for a soft combining, a new data offset used to empty a buffer for an initial transmission in relation to a HARQ process, a transmit power control command for PUCCH, a UL index needed for a TDD operation, and the like.

In case of the DCI format 1, most of control information is similar to that of the DCI format 1A. Yet, while the DCI format 1A is related to a consecutive resource allocation, the DCI format 1 supports a non-consecutive resource allocation. Hence, since the DCI format 1 further includes a resource allocation header, a control signaling overhead may increase a little as a tradeoff for an increase of resource allocation flexibility.

When the DCI format 1B and 1D are compared with the DCI format 1, there exists something in common in that they further include precoding information. The DCI format 1B and the DCI format 1D include PMI confirmation and DL power offset information, respectively. The other control information included in the DCI format 1B and 1D is mostly matched with that of the DCI format 1A.

The DCI format 2, 2A, 2B, and 2C basically include most of the control informations included in the DCI format 1A and further include informations used for a spatial multiplexing. The informations used for the spatial multiplexing correspond to a modulation and coding scheme for a second transmission block, a new data offset, and a redundancy version.

The DCI format 2 supports a closed-loop spatial multiplexing and the DCI format 2A supports an open-loop spatial multiplexing. Both the DCI format 2 and the DCI format 2A include precoding information. The DCI format 2B supports a dual-layer spatial multiplexing combined with a beamforming and further includes cyclic shift information for a DMRS. The DCI format 2C can be understood as an extended version of the DCI format 2B and supports a spatial multiplexing up to eight layers.

The DCI format 3 and 3A can be used to supplement the transmit power control information, which is included in the aforementioned DCI formats configured to perform UL scheduling grant and DL scheduling assignment. In particular, the DCI format 3 and 3A can be used to support a semi-persistent scheduling. In case of the DCI format 3, a command of 1 bit-long is used per UE. In case of the DCI format 3A, a command of 2-bit long is used per UE.

Among the aforementioned DCI formats, a prescribed DCI format is transmitted on PDCCH and a plurality of PDCCHs can be transmitted within a control region. A UE can monitor a plurality of the PDCCHs.

Configuration of Downlink (DL) Control Channel

Basically, first three OFDM symbols of each subframe can be used for a region to which a DL control channel is transmitted and 1 to 3 OFDM symbols can be used depending on an overhead of the DL control channel. In order to control the number of OFDM symbols used for a DL control channel according to each subframe, PCFICH may be used. The PCFICH can be used to provide a confirmation response (positive confirmation response (ACK)/negative confirmation response (NACK)) for UL transmission. And, in order to transmit control information for a DL data transmission or a UL data transmission, PDCCH may be used.

Figure 5:
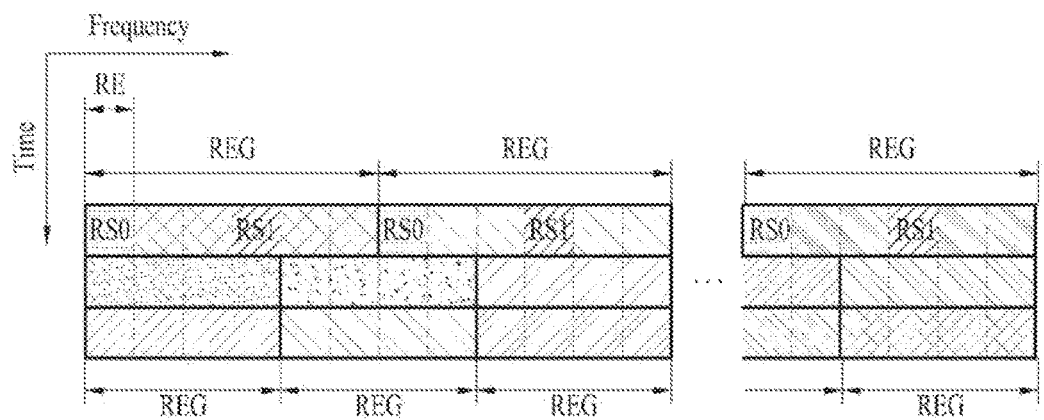
FIG. 5 and FIG. 6 are diagrams for a resource element group (REG) corresponding to a unit to which downlink control channels are assigned.
Figure 6:
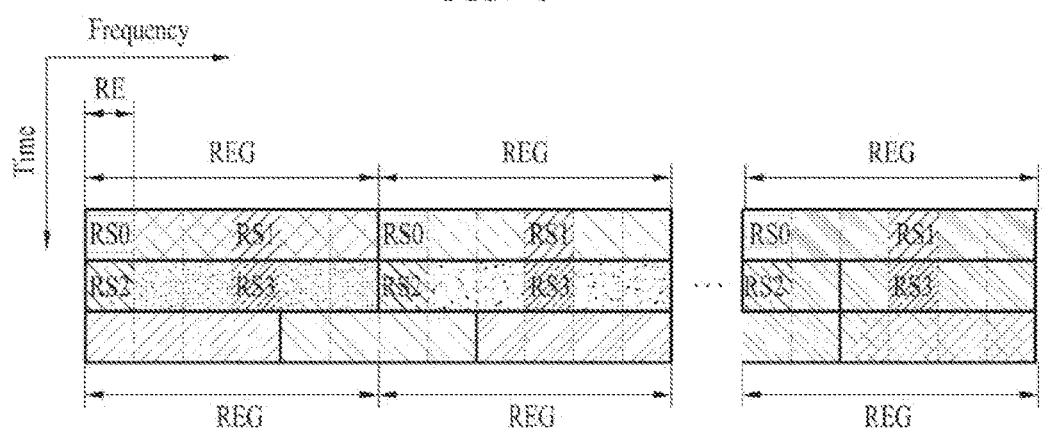

FIG. 5 and FIG. 6 indicate that the aforementioned DL control channels are assigned by a resource element group (REG) unit in a control region of each subframe. FIG. 5 is a diagram for one example of a resource configuration of a DL control channel in a system having 1 or 2 transmitting (Tx) antennas. And, FIG. 6 is a diagram for one example of a resource configuration of a DL control channel in a system having 4 transmitting (Tx) antennas. As depicted in FIG. 5 and FIG. 6, an REG, which is a basic unit to which a control channel is assigned, may include 4 contiguous resource elements in frequency domain except a resource element to which a reference signal is allocated. The specific number of REGs can be used to transmit a DL control channel in accordance with an overhead of the DL control channel.

PCFICH (Physical Control Format Indicator Channel)

PDCCH can be transmitted between an OFDM symbol index 0 and 2 in each subframe to provide resource allocation information of each subframe. Depending on overhead of a control channel, OFDM symbol index 0, OFDM symbol index 0 and 1, or OFDM symbol index 0 to 2 can be used. As mentioned in the foregoing description, the number of OFDM symbols used by the DL control channel is changeable, of which information is indicated by the PCFICH. Therefore, the PCFICH should be transmitted in each subframe.

3 kinds of information can be provided by the PCFICH. Table 1 indicates a CFI (control format indicator) of the PCFICH. A CFI value set to 1 indicates that PDCCH is transmitted on OFDM symbol index 0, a CFI value set to 2 indicates that PDCCH is transmitted on OFDM symbol index 0 and 1, and a CFI value set to 3 indicates that PDCCH is transmitted on OFDM symbol index 0 to 2.

TABLE 1

| CFI | CFI codeword $< b_0, b_1, \ldots, b_{31} >$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information transmitted on PCFICH can be differently defined according to a system bandwidth. For instance, if a system bandwidth is less than a specific threshold, the CFI value set to 1, 2, and 3 may indicate that 2, 3, and 4 OFDM symbols are used for PDCCH, respectively.

Figure 7:
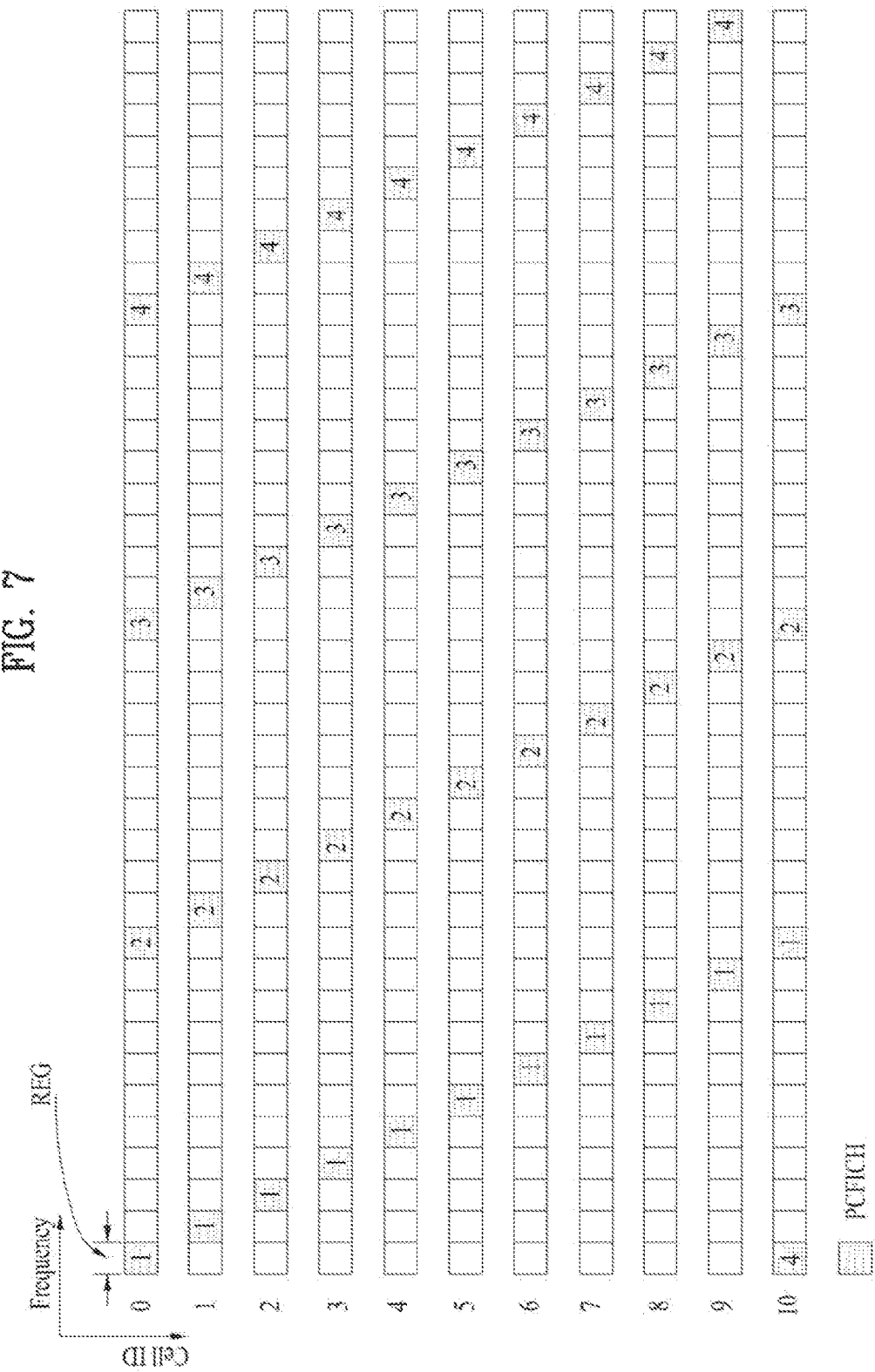
FIG. 7 is a diagram for a type of transmitting a physical control format indicator channel (PCFICH)

FIG. 7 is a diagram for a type of transmitting a physical control format indicator channel (PCFICH). Referring to FIG. 7, REG includes 4 subcarriers, and more particularly, data subcarriers except a reference signal. In general, a transmit diversity scheme can be applied to the REG. In order to prevent inter-cell interference, the REG may be shifted in frequency domain in every cell, i.e., in accordance with a cell ID. In addition, since the PCFICH is transmitted on a first OFDM symbol (OFDM symbol index 0) of a subframe all the time, if a receiver receives the subframe, the receiver preferentially checks information of the PCFICH, identifies the number of OFDM symbols to which PDCCH is transmitted, and then receives control information transmitted on the PDCCH.

PHICH (Physical Hybrid-ARQ Indicator Channel)

Figure 8:
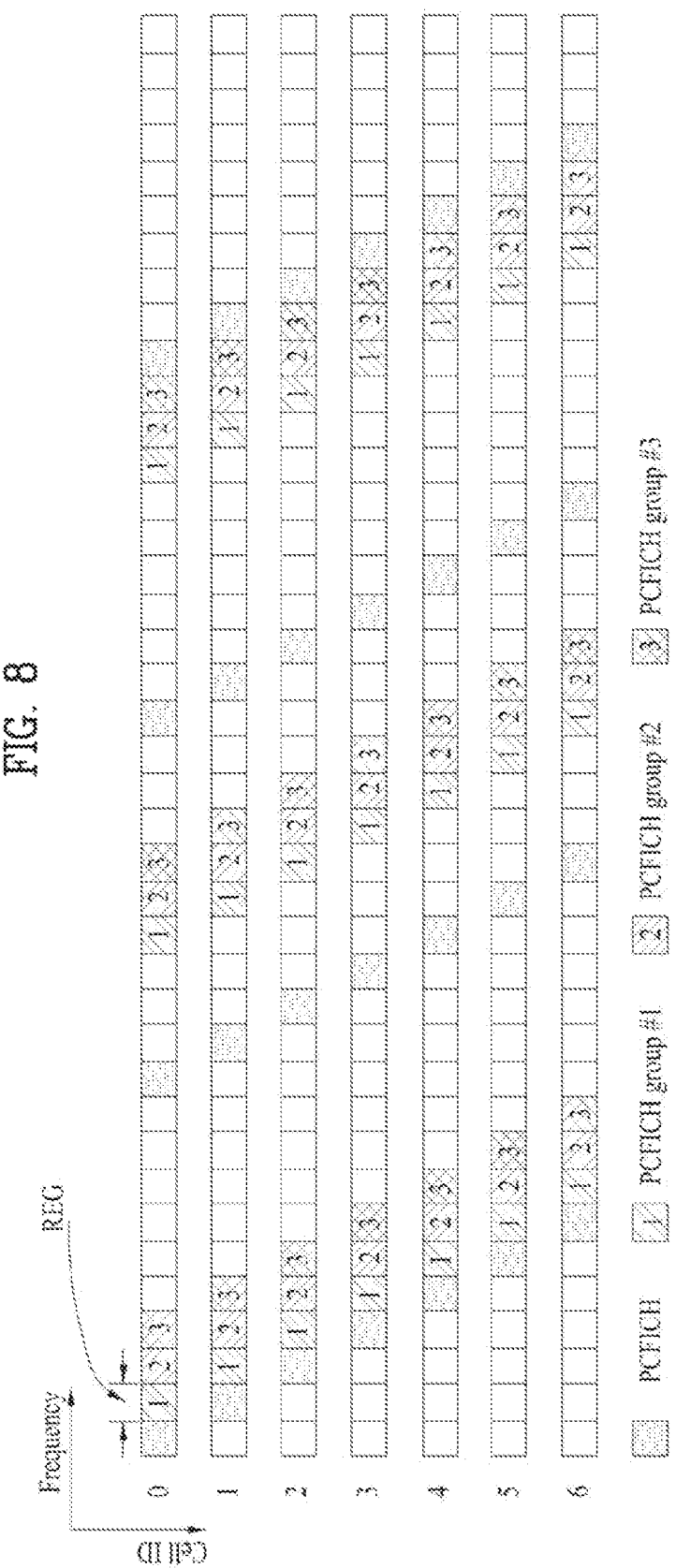
FIG. 8 is a diagram for a position of a PCFICH and a position of a physical HARQ indicator channel (PHICH)

FIG. 8 is a diagram for a position of a PCFICH and a position of a physical HARQ indicator channel (PHICH) generally applied in a specific bandwidth. First of all, PHICH is a channel that carries ACK/NACK information on a DL data transmission. Pluralities of PHICH groups are formed in one subframe and pluralities of PHICHs exist in one PHICH group. Hence, one PHICH group may include PHICHs for a plurality of user equipments.

As depicted in FIG. 8, PHICH allocation for each user equipment in several PHICH groups is performed using a lowest PRB (physical resource block) index of a PUSCH resource allocation and a cyclic shift index for a demodulation reference signal (DMRS) transmitted on an uplink grant PDCCH. The DMRS is a UL reference signal provided together with UL transmission to perform channel estimation for a UL data demodulation. The PHICH resource is known as such an index pair as $(n_{PHICH}^{group}, n_{PHICH}^{seq})$. In this case, $n_{PHICH}^{group}$ and $n_{PHICH}^{seq}$ in the sequence pair $(n_{PHICH}^{group}, n_{PHICH}^{seq})$ indicate a PHICH group number and an orthogonal sequence index in the corresponding PHICH group, respectively. The above-mentioned $n_{PHICH}^{group}$ and $n_{PHICH}^{seq}$ may be defined by Formula 1 in the following.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad \text{[Formula 1]}$$

In Formula 1, $n_{DMRS}$ indicates a cyclic shift of DMRS used for a UL transmission related to PHICH and is mapped to a value of a 'cyclic shift for DMRS' field of a latest UL grant control information (e.g., DCI format 0 or 4) on a transport block (TB) related to corresponding PUSCH transmission. For instance, the 'cyclic shift for DMRS' field of the latest UL grant DCI format may have a size of 3-bit. If this field has a value of '000', $n_{DMRS}$ can be configured to have a value of '0'.

In Formula 1, $N_{SF}^{PHICH}$ indicates a size of a spreading factor used for PHICH modulation. $I_{PRB\_RA}^{lowest\_index}$ indicates a lowest PRB index in a first slot used for corresponding PUSCH transmission. $I_{PHICH}$ has a value of '1' on a special case (UL/DL configuration is set to '0' and PUSCH is transmitted in $4^{th}$ or $9^{th}$ subframe) in a TDD system. Otherwise, $I_{PHICH}$ has a value of '0'. $N_{PHICH}^{group}$ indicates the number of PHICH group(s) configured by an upper layer and can be defined by Formula 2 in the following.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Formula 2]}$$

In Formula 2, $N_g$ indicates information on a size of PHICH resource transmitted on PBCH (Physical Broadcast Channel). $N_g$ has a size of 2-bit and is represented as $(N_g \in \{1/6, 1/2, 1/2\})$. In Formula 2, $N_{RB}^{DL}$ indicates the number of resource block(s) configured in DL.

Table 2 shows one example of an orthogonal sequence defined by a legacy 3GPP LTE release 8/9.

TABLE 2

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 9:
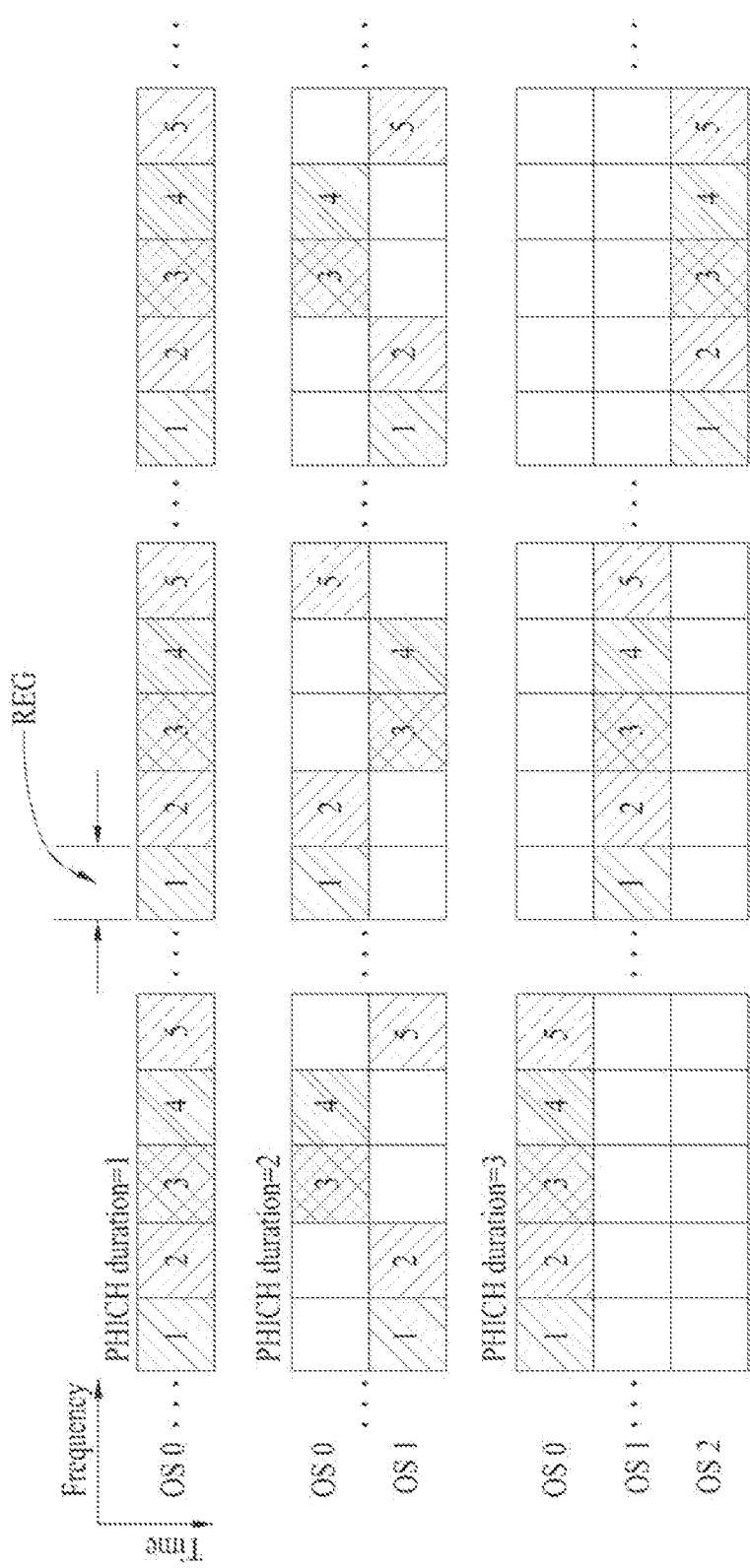
FIG. 9 is a diagram for a position of a downlink resource element to which a PHICH group is mapped.

FIG. 9 is a diagram for a position of a downlink resource element to which a PHICH group is mapped. As depicted in FIG. 9, the PHICH group can be configured on a different time domain (i.e., different OS (OFDM symbol)) within one subframe according to PHICH duration.

PDCCH Processing

When PDCCH is mapped to REs, a control channel element (CCE), which is a consecutive logical allocation unit, is used. One CCE includes a plurality (e.g., 9) of resource element groups (REGs) and one REG consists of 4 contiguous REs except a reference signal (RS).

The number of CCE used for a transmission of a specific PDCCH vary according to a DCI payload, which is a size of control information, a cell bandwidth, a channel coding rate, and the like. Specifically, the number of CCEs necessary for a specific PDCCH can be defined according to a PDCCH format as shown in a Table 3 as follows.

TABLE 3

| PDCCH format | Number of CCEs | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As mentioned in the foregoing description, PDCCH can be used by a prescribed one format among the four formats and the prescribed one format is not informed to a UE. Hence, the UE should perform a decoding while the PDCCH format is not known to the UE. This is called a blind decoding. Yet, since decoding all available CCEs used for a DL according to each PDCCH format may become a big burden to the UE, a search space is defined in consideration of a limitation for a scheduler and the number of decoding attempts.

In particular, the search space is a set of candidate PDCCHs consisted of CCEs on which a UE should perform a decoding attempt on an aggregation level. In this case, the aggregation level and the number of PDCCH candidates can be defined as Table 4 in the following.

TABLE 4

| | Search space | | Number of PDCCH candidates |
|---|---|---|---|
| | Aggregation level | Size (CCE unit) | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, since there exist 4 types of aggregation levels, a UE may have a plurality of search spaces according to each of the aggregation levels. As depicted in Table 4, the search space can be divided into a UE-specific search space and a common search space. The UE-specific search space is configured for specific UEs. Each UE monitors (performing a decoding attempt on a set of PDCCH candidates according to an available DCI format) the UE-specific search space and checks whether an RNTI and a CRC masked on PDCCH is valid. If it is valid, the UE can obtain control information.

The common search space is configured for such a case that a plurality of UEs or all UEs need to receive PDCCH as a dynamic scheduling for system information, a paging message, or the like. Yet, the common search space can also be used for a specific UE in managing a resource. And, the common search space and the UE-specific search space may overlap with each other.

Specifically, the search space can be determined by Formula 3 as follows.

$$L\{(Y_k+m')\bmod \lfloor N_{CCE,k}/L \rfloor\}+i \qquad \text{[Formula 3]}$$

In this case, L indicates an aggregation level, $Y_k$ indicates a variable determined by RNTI and a subframe number k, and m' indicate the number of PDCCH candidates. In case that carrier aggregation is applied, $m'=m+M^{(L)} \cdot n_{CI}$. Otherwise, m'=m, where m=0, . . . , $M^{(L)}-1$. $M^{(L)}$ indicates the number of PDCCH candidates, $N_{CCE,k}$ indicates the total number of CCEs of a control region in a $K^{th}$ subframe, and i indicates an index for designing an individual CCE in each PDCCH candidate in PDCCH and may be represented as 'i=0, . . . , L-1. In case of the common search space, $Y_k$ is always determined as '0'.

Figure 10:
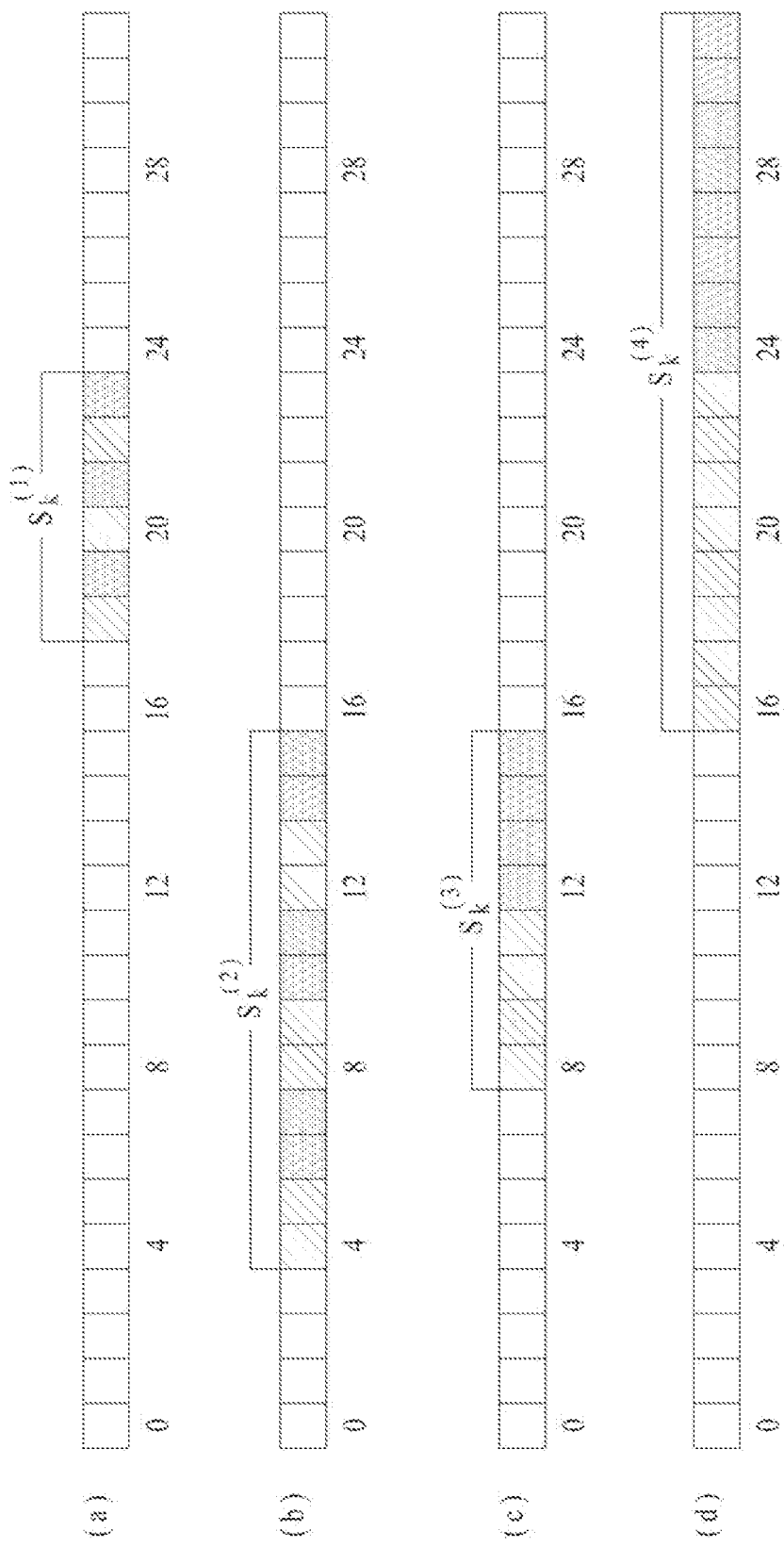
FIG. 10 is a diagram for explaining a search space in each aggregation level.

FIG. 10 indicates a UE-specific search space (shaded part) capable of being defined by the aforementioned Formula 3 in each aggregation level. In this case, carrier aggregation is not used. For clarity, $N_{CCE,k}$ exemplified by 32 in the drawing.

FIGS. 10 (a), (b), (c), and (d) exemplify cases of an aggregation level 1, 2, 4, and 8, respectively. Numbers in FIG. 10 indicate CCE numbers. In FIG. 10, as mentioned in the foregoing description, a start CCE of a search space is determined by RNTI and a subframe number k in each of aggregation levels. Due to modulo function and L, the start CCE can be differently determined within an identical subframe for one UE according to each of the aggregation levels. And, the start CCE is determined as a multiple of the aggregation level due to the L. In this case, for instance, it is assumed that $Y_k$ corresponds to a CCE number 18. A UE sequentially attempts to decode CCEs from the start CCE by a CCE unit determined according to a corresponding aggregation level. For instance, referring to FIG. 10 (b), a UE attempts to decode the CCEs from a CCE number 4, which corresponds to the start CCE, by 2 CCE units according to the corresponding aggregation level.

As mentioned in the foregoing description, a UE attempts to decode a search space. The number of decoding attempts is determined by a transmission mode which is determined by a DCI format and an RRC signaling. If carrier aggregation is not applied, since a UE should consider two types of DCI size (DCI format 0/1A/3/3A and DCI format 1C) for each of 6 PDCCH candidates for the common search space, the UE needs to perform maximum 12 decoding attempts. For a UE-specific search space, since the UE considers two types of DCI size for the number of PDCCH candidates (6+6+2+2), the UE needs to perform maximum 32 decoding attempts. Hence, if the carrier aggregation is not applied, maximum 44 decoding attempts are required.

Meanwhile, if the carrier aggregation is applied, since decoding for the UE-specific search space as many as the number of DL resources (component carriers) and the DCI format 4 is added, the number of maximum decoding attempts may further increase.

Uplink (UL) Retransmission

In LTE/LTE-A system, retransmission is performed based on a synchronous non-adaptive retransmission. A synchronous adaptive retransmission may be used due to such a reason as a collision with a random access resource and the like.

In this case, the synchronous transmission means a scheme that a retransmission is performed on a predetermined timing point (e.g., n+k subframe) after a timing point (e.g., $n^{th}$ subframe) on which one data packet is transmitted (in case of FDD, k equals to 4). The non-adaptive retransmission is a scheme that uses a frequency resource and a transmission method identical to a frequency resource (e.g., physical resource block (PRB)) region and a transmission method (e.g., modulation scheme, and the like) used for a previous transmission. Meanwhile, the adaptive retransmission is a scheme that a frequency resource in which a retransmission is performed according to scheduling information indicated by a UL grant and a transmission method may be differently configured from a previous transmission.

UL retransmission can be indicated by the aforementioned PHICH and DCI format 0 or 4. A UE can perform a synchronous non-adaptive retransmission by receiving ACK/NACK for a previous UL transmission on PHICH. Or, a UE can perform a synchronous adaptive retransmission by receiving a UL grant from an eNode B via the DCI format 0 or 4.

If a UE receives PHICH and UL grant PDCCH at the same time, the UE can perform a UL transmission according to control information of the UL grant PDCCH while ignoring PHICH. A new data indicator (NDI) is included in the UL grant PDCCH (e.g., DCI format 0 or 4). If an NDI bit is toggled compared to a previously provided NDI value, a UE regards it as a previous transmission is successful and may be then able to transmit a new data. Meanwhile, although the UE receives ACK for a previous transmission on PHICH, if an NDI value is not toggled in the UL grant PDCCH, which is simultaneously or afterward received with the PHICH, the UE is configured not to flush a buffer for the previous transmission.

Uplink (UL) Retransmission Timing

Figure 11:
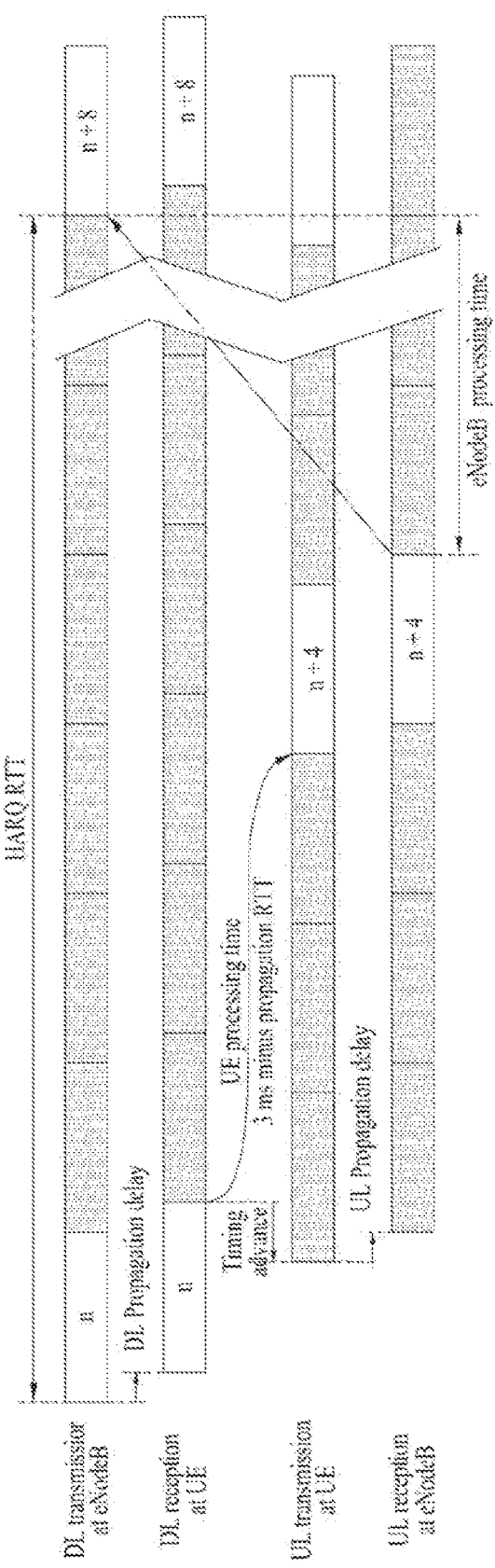
FIG. 11 is a diagram for explaining uplink retransmission timing.

In the following description, a timing relation of the aforementioned UL retransmission is explained with reference to FIG. 11. In case of FDD in LTE/LTE-A system, if a UE receives PDSCH in an $n^{th}$ subframe, the UE transmits ACK/NACK for the PDSCH in n+4 subframe. FIG. 11 assumes the aforementioned case.

Referring to FIG. 11, if an eNode B transmits PDSCH and PDCCH indicating the PDSCH in $n^{th}$ subframe (DL transmission at eNode B), a UE receives the PDSCH and the PDCCH after a DL propagation delay passes (DL reception at UE). The UE has to transmit ACK/NACK for the PDSCH to the eNode B in n+4 subframe. In this case, due to a propagation delay occurred in transmitting the ACK/NACK to the eNode B, i.e., a UL propagation delay and the DL propagation delay occurred in receiving the PDSCH, the UE should perform a timing advance.

Hence, a processing time, which is permitted to the UE to receive and decode the PDSCH, generate ACK/NACK, and transmit the ACK/NACK, may become (3 ms—propagation round trip time (RTT)) instead of 3 ms corresponding to time of 3 subframes. In case of considering a cell radius of 100 km, the RTT corresponds to 0.66 ms. Hence, the processing time of the UE may correspond to 2.34 ms.

PUSCH Transmission Timing

A moment of receiving a UL grant on PDCCH and a moment of transmitting PUSCH according to the UL grant are fixed. Specifically, if a UE receives the UL grant in an $n^{th}$ subframe in FDD, the UE transmits PUSCH in n+4 subframe. Since there are various TDD configurations in TDD, unlike the FDD, a timing of 'n+4' cannot be applied to all cases. Hence, an UL index field indicating an UL subframe to which a UL grant is applied is included in a DCI together with the UL grant.

In case of transmitting PUSCH, a processing time similar to the aforementioned UL retransmission timing can be provided. Compared to the case of the UL retransmission timing, the processing time is little bit more than that of the UL retransmission timing. This is because, in case of PUSCH transmission, the UL grant can be known by decoding first 3 (maximum 4) OFDM symbols of a subframe for PDCCH, the processing time as much as several OFDM symbols may further be provided compared to a case of the UL retransmission timing, which should decode all of a subframe.

Although the aforementioned UL retransmission timing and the PUSCH transmission timing are determined based on an appropriated processing timing of a UE, if a currently studying e-PDCCH is introduced, a problem may occur. In the following description, the e-PDCCH is explained in more detail and embodiments of the present invention for the UL retransmission timing and the PUSCH transmission timing capable of providing sufficient processing timing to a UE in case of introducing the e-PDCCH are explained.

First of all, the currently studying e-PDCCH is a concept of transmitting PDCCH to a data region, i.e., a resource region used for transmitting PUSCH in a legacy LTE/LTE-A system. The e-PDCCH is introduced due to a capacity limitation of a legacy PDCCH used for carrier aggregation, coordinated multi point (CoMP), MU-MIMO (multi user multiple input multiple output), MTC (machine type communication), HetNet (heterogeneous network), and the like, inter-cell interference problem between PDCCHs and/or interference between PDCCH and PUSCH/PUCCH, and the like. As mentioned in the foregoing description, the e-PDCCH can be transmitted in the PDSCH region and can be performed based on a DMRS (demodulation reference signal). In particular, when a UE decodes the e-PDCCH, the UE can use the DMRS to perform channel estimation. To this end, an eNode B can perform a precoding both the e-PDCCH and the DMRS together.

In case of introducing the e-PDCCH, the aforementioned UL retransmission timing and the PUSCH transmission timing may fail to provide sufficient processing time to a UE. More specifically, since a legacy structure corresponds to a structure transmitting PDCCH to a first 3 (4) symbols of a subframe and then transmitting PDSCH thereafter, a UE preferentially decodes the PDCCH and then decodes the PDSCH in a resource region indicated by a DCI. Hence, the processing time necessary for decoding the PDCCH is not an important factor in determining the UL retransmission timing and the PUSCH transmission timing. Yet, as mentioned in the foregoing description, since the e-PDCCH can be transmitted in the PDSCH region, it is necessary for a UE to receive all signals of a subframe to decode the e-PDCCH. In other word, the UE receives all signals of a subframe, decodes the e-PDCCH, and then should decode the PDSCH in sequence. Hence, compared to the legacy structure, it is necessary to have more time to complete decoding of the e-PDCCH and the processing time of the UE secured by the legacy timing is reduced. Consequently, the UE may fail to transmit the ACK/NACK according to the previously defined timing relation or the PUSCH due to the e-PDCCH.

In order to solve the aforementioned problem, transmission of the e-PDCCH and transmission timing of ACK/NACK or PUSCH are explained in the following description with reference to FIG. 12 to FIG. 13.

Figure 12:
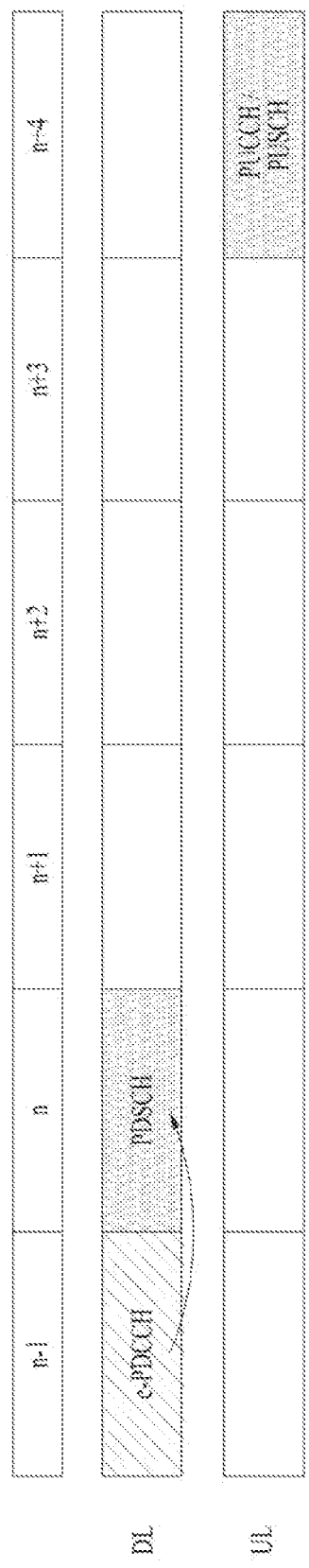
FIG. 12 is a diagram for explaining uplink transmission timing according to one embodiment of the present invention.

FIG. 12 is a diagram for explaining uplink transmission timing according to one embodiment of the present invention.

Referring to FIG. 12, an eNode B transmits PDSCH to a UE in an $n^{th}$ subframe and the UE transmits ACK/NACK for the PDSCH in an n+4 subframe, which is a $4^{th}$ following subframe of the subframe in which the PDSCH is transmitted, on PUCCH or PUSCH. In this case, if the PDCCH indicating the PDSCH transmitted in the $n^{th}$ subframe corresponds to an e-PDCCH instead of the PDCCH of a legacy LTE/LTE-A system, the e-PDCCH can be transmitted in a $k^{th}$ preceding subframe of the $n^{th}$ subframe.

In this case, k value is determined in consideration of processing time of the UE. In some cases, the k value can be flexibly determined in consideration of a cell size, a position of a UE in a cell, and the like. Yet, since the eNode B should consider a worst case and it is not preferable to change a transmission timing of control information, it is most preferable to transmit the e-PDCCH in a subframe immediately before the subframe in which the PDSCH is transmitted, i.e., an n−1 subframe as depicted in FIG. 12.

And, in the legacy LTE/LTE-A system, a DCI including DL scheduling allocation, more specifically, allocation information of a resource block to which the PDSCH is transmitted is valid in a subframe to which a corresponding PDCCH is transmitted only. Hence, as described in the embodiment of the present invention, in case that the DL scheduling allocation information indicating the PDSCH is transmitted on the e-PDCCH and the e-PDCCH is transmitted in the $k^{th}$ preceding subframe of the subframe in which the PDSCH is transmitted, unlike the legacy structure, the DL scheduling allocation information needs to be additionally configured to be valid for subframes as much as the k value.

Subsequently, FIG. 13 is a diagram for explaining PUSCH transmission timing according to one embodiment of the present invention.

Referring to FIG. 13, while PDCCH is transmitted in an $n^{th}$ subframe and PUSCH is transmitted in an n+4 subframe, a DCI including an UL grant for PUSCH transmission is transmitted in an n−1 subframe on e-PDCCH. By doing so, a UE can sufficiently obtain processing time until the UL grant is obtained and the PUSCH is transmitted.

In this case, although a subframe in which the e-PDCCH is transmitted is exemplified by an n−2 subframe in FIG. 13, as mentioned in the foregoing description, the e-PDCCH can be transmitted in the $N^{th}$ preceding subframe as well.

And, according to the aforementioned explanation, since the PUSCH transmission timing is differentiated from the PUSCH transmission timing of the legacy UL grant, information informing the UE of the change can be included in the DCI (DCI format 0 and 4) including the UL grant or can use a legacy field. In case of using the legacy field, a UL index field informing a subframe for PUSCH transmission in TDD can be utilized. More specifically, the UL index field is included in the DCI in TDD only. Yet, the UL index field may be managed in a manner of being included in FDD as well and informing the change of the UL grant and the PUSCH transmission timing.

FIG. 14 is a diagram for a configuration of an eNode B and a user equipment according to the present invention.

Referring to FIG. 14, the eNode B 1410 according to the present invention includes a reception module 1411, a transmission module 1412, a processor 1413, a memory 1414, and a plurality of antennas 1415. A plurality of the antennas 1415 means the eNode B capable of supporting MIMO transmission and reception. The reception module 1411 can receive various signals, a data, and information in UL from the UE. The transmission module 1412 can transmit various signals, a data, and information in DL to the UE. The processor 1413 can control overall operations of the eNode B 1410 and operate to implement the aforementioned embodiment of the present invention.

Besides, the processor 1413 of the eNode B 1410 is configured to perform a function of processing information received by the eNode B 1410, information to be transmitted to an external, and the like. The memory 1414 is configured to store the processed information for a prescribed time and can be substituted by such a configuration element as a buffer (not depicted), or the like.

Subsequently, referring to FIG. 14, the UE 1420 according to the present invention includes a reception module 1421, a transmission module 1422, a processor 1423, a memory 1424, and a plurality of antennas 1425. A plurality of the antennas 1425 means the UE capable of supporting MIMO transmission and reception. The reception module 1421 can receive various signals, a data, and information in DL from the eNode B. The transmission module 1422 can transmit various signals, a data, and information in UL to the eNode B. The processor 1423 can control overall operations of the UE 1420 and operate to implement the aforementioned embodiment of the present invention.

Besides, the processor 1423 of the UE 1420 is configured to perform a function of processing information received by the UE 1420, information to be transmitted to an external, and the like. The memory 1424 is configured to store the processed information for a prescribed time and can be substituted by such a configuration element as a buffer (not depicted), or the like.

Detail configuration of the eNode B and the UE can be implemented to independently apply the aforementioned contents explained in various embodiments of the present invention or to simultaneously apply two or more embodiments. The overlapped contents are omitted for clarity of explanation.

And, in explaining FIG. 14, explanation on the eNode B 1410 can be identically applied to a device as a main agent of DL transmission or a main agent of UL reception. Explanation on the UE 1420 can be identically applied to a relay as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

Although the aforementioned explanation describes the present invention in a manner of mainly concerning a form applied to a 3GPP LTE mobile communication system, the present invention can be used for various kinds of mobile communication systems with an identical or an equivalent principle.

What is claimed is:

1. A method of transmitting control information, which is transmitted by an eNode B in a wireless communication system, comprising the steps of:
   transmitting a downlink control information (DCI) indicating a PDSCH on a data region of a specific subframe,
   wherein the data region corresponds to symbols in the specific subframe except a first 3 or 4 symbols indicated by a physical control format indication channel (PCFICH);
   transmitting a data on the PDSCH in a k-th following subframe of the specific subframe; and
   receiving a reception confirmation response for the data in a (k+4)-th following subframe from the specific subframe.

2. The method of claim 1, wherein the k is determined in consideration of at least one selected from the group consisting of a cell size, a processing time of a user equipment (UE), and a position of the UE within a cell.

3. The method of claim 1, wherein the DCI is transmitted in a subframe immediately before a subframe in which the PDSCH is transmitted.

4. The method of claim 1, wherein the DCI does not indicate any PDSCH except the PDSCH.

5. A method of receiving control information, which is received by a user equipment (UE) in a wireless communication system, comprising the steps of:
   receiving a downlink control information (DCI) indicating a PDSCH on a data region of a specific subframe,
   wherein the data region corresponds to symbols in the specific subframe except a first 3 or 4 symbols indicated by a physical control format indication channel (PCFICH);
   receiving a data on the PDSCH in a k-th following subframe of the specific subframe; and
   transmitting a reception confirmation response for the data in a (k+4)-th following subframe from the specific subframe.

6. The method of claim 5, wherein the k is determined in consideration of at least one selected from the group consisting of a cell size, a processing time of a user equipment (UE), and a position of the UE within a cell.

7. The method of claim 5, wherein the DCI is transmitted in a subframe immediately before a subframe in which the PDSCH is transmitted.

8. The method of claim 5, wherein the DCI does not indicate any PDSCH except the PDSCH.

9. An eNode B in a wireless communication system, comprising:
   a Radio Frequency (RF) module; and
   a processor operably coupled with the RF module and configured to:
     transmit a downlink control information (DCI) indicating a PDSCH on a data region of a specific subframe,
     wherein the data region corresponds to symbols in the specific subframe except a first 3 or 4 symbols indicated by a physical control format indication channel (PCFICH);
     transmit a data on the PDSCH in a k-th following subframe of the specific subframe; and
     receive a reception confirmation response for the data in a (k+4)-th following subframe from the specific subframe.

10. A user equipment (UE) in a wireless communication system, comprising:
    a Radio Frequency (RF) module; and
    a processor operably coupled with the RF module and configured to:
      receive a downlink control information (DCI) indicating a PDSCH on a data region of a specific subframe,
      wherein the data region corresponds to symbols in the specific subframe except a first 3 or 4 symbols indicated by a physical control format indication channel (PCFICH);
      receive a data on the PDSCH in a k-th following subframe of the specific subframe; and
      transmit a reception confirmation response for the data in a (k+4)-th following subframe from the specific subframe.

* * * * *